United States Patent [19]
Simonfi et al.

[11] 3,779,734
[45] Dec. 18, 1973

[54] METHOD OF MAKING COPPER-COLORED RUBY GLASS

[75] Inventors: Paul Simonfi, Turda; Viorel Cristea, Timisoara, both of Romania

[73] Assignee: Fabrica de Sticlarie Turda, Turda, Romania

[22] Filed: Apr. 24, 1972

[21] Appl. No.: 246,901

Related U.S. Application Data

[63] Continuation-in-part of Ser. No. 207,673, Dec. 13, 1971, abandoned, which is a continuation of Ser. No. 812,880, Apr. 2, 1969, abandoned.

[52] U.S. Cl. ............... 65/136, 65/32, 65/137, 106/52, 106/54, 106/84
[51] Int. Cl. ......... C03b 5/16, C03c 3/20, C03c 3/08
[58] Field of Search .................. 65/134, 136, 137, 65/32; 106/52, 84, 54

[56] References Cited
UNITED STATES PATENTS
| | | | |
|---|---|---|---|
| 3,498,806 | 3/1970 | Hammer et al. | 106/52 |
| 2,233,343 | 2/1941 | Dobrovolny et al. | 106/52 |

FOREIGN PATENTS OR APPLICATIONS
| | | | |
|---|---|---|---|
| 101,636 | 12/1955 | U.S.S.R. | |
| 995,576 | 6/1965 | Great Britain | 65/134 |

OTHER PUBLICATIONS

Weyl, W., Coloured Glass–pub. 1967 by Society of Glass Technology, Sheffield, England, pp. 425–432.

*Primary Examiner*—Helen M. McCarthy
*Attorney*—Karl F. Ross

[57] ABSTRACT

A process for making copper-colored ruby glass in which a copper-tin alloy (bronze) is wetted with sodium silicate water glass solution and introduced into a soda-lime glass batch, together with potassium nitrate, as an oxidizing agent, and in the absence of reducing agents, melted at up to 1,480°C and in which ruby-red coloration appears upon rapid cooling.

3 Claims, No Drawings

METHOD OF MAKING COPPER-COLORED RUBY GLASS

CROSS-REFERENCE TO RELATED APPLICATIONS

This application is a continuation-in-part of our application, Ser. No. 207,673 filed 13 Dec. 1971 as a continuation of application Ser. No. 812,880 filed 2 Apr. 1969, both now abandoned.

FIELD OF THE INVENTION

Our present invention relates to a method of or a process for producing ruby glass and, more particularly, to a method of or a process for the coloring of soda-lime glass so as to impart a ruby-red coloration thereto.

BACKGROUND OF THE INVENTION

The production of ruby glass by adding a copper-containing colorant to a batch of otherwise uncolored glass, has been described in the literature. For example, it is known to add cuprous oxide or cupric oxide or copper sulfate to the glass mixture, generally under reducing conditions brought about by the introduction of reducing agents and controlling the melting and cooling so that, it is believed, colloidal particles of copper are formed in the glass to yield the desired red or ruby coloration. Because of the control required, it has generally been a practice to use glass fritting techniques or to withhold the colorant until the last parts of the process. We should also mention that it is known to obtain a coloration of glass by introducing powdered copper-tin alloys (bronzes) in the presence of reducing agents, into the glass melt.

These techniques have generally been found to be unsatisfactory since the presence of a reducing agent does not allow large amounts of colorant to be introduced. Furthermore, it is difficult to maintain the critical atmosphere and melt temperature to avoid undesirable color deviations arising from partial oxidation of the copper whereby blue or green coloration is obtained.

OBJECTS OF THE INVENTION

It is an important object of the present invention to provide an improved method of or process for the production of ruby-colored glass, especially ruby-red soda-lime glass, at low cost, with intense uniform coloration and with freedom from discoloration by oxidation of copper-containing materials.

SUMMARY OF THE INVENTION

These objects and other which will become apparent hereinafter are attained, in accordance with our invention, which provides for the incorporation in a soda-lime glass, for example, a colorant consisting of a bronze of the type already described but which has been coated with sodium silicate, the function of which is described in greater detail below.

The starting material is preferably a soda-lime glass made by any conventional process and of any conventional composition as described, for example, in the art. A typical soda-lime glass may have 78 to 45 parts by weight of granitic materials (e.g. crushed granite), 10 to 20 parts by weight of sodium silicate, lime or limestone in an amount of 5 to 15 parts by weight and, if desired, any additives intended to produce specific characteristics of the glass. Such additives may be manganese, asbestos or the like. The glasses which are used may also contain potash as described in U.S. Pat. No. 2,233,343 or U.S. Pat. No. 2,174,554. Typical base glass composition may thus contain:

| | |
|---|---|
| $SiO_2$ | 60 to 75 percent by weight |
| $Al_2O_3$ | 0.3 to 14 percent by weight. |

Calcium Oxide and manganese oxide 6 to 15 percent by weight

| | |
|---|---|
| $Na_2O$ | 7 to 18 percent by weight |
| $K_2O$ | 0 to 5 percent by weight. |
| barium oxide | 0 to 5 percent by weight. |
| selenium | 0.00025 percent to 0.00035 percent by weight |

A preferred composition is:
$SiO_2$ — 72–75 percent by weight
$Na_2O$ — 15–18 percent
$K_2O$ — 1–3 percent
$CaO$ — 6–8 percent
$B_2O_3$ — 0.5–1 percent The conditions and procedures for making the base glass are conventional and may be found at page 245, Handbook of GLASS MANUFACTURE, Odgen Publishing Co., New York, N. Y.

According to the principles of the present invention, in a preferred embodiment, the bronze consists of a white crystalline alloy containing 60 percent by weight of copper and 40 percent by weight tin, together with the usual impurities, zinc, aluminum, iron phosphorus and sulfate. The alloy is coated with water glass, a silica-containing liquid with a slightly opalescent aspect, a density at 20°C of 1.36 to 1.38, a minimum $SiO_2$ content of 25 percent by weight, up to 1.0 percent by weight of iron and aluminum oxides, a maximum of $Fe_2O_3$ content of 0.15 percent by weight, a maximum calcium oxide content of about 0.15 percent by weight and a maximum sodium chloride content of 0.01 percent by weight.

Advantageously, the alloy can be added in powdered form after coating with the water-glass solution, in any quantity which will provide the desired depth of coloration.

While we do not wish to be bound by any theory with regard to the mode of operation of the present invention, we believe that the sodium silicate waterglass after drying functions as a sheath for the bronze powder during the glass-melting process.

The literature is in dispute on the mechanism of the formation of the ruby-red coloration with some authors in the field holding that the coloration is caused by metallic copper in colloidal-particle form while others urge that the coloration derives from the presence of cuprous oxide in the glass. Again, we wish in no way to contribute to this controversy although we have found that surprisingly improved results are obtained when an oxidizing agent, especially potassium nitrate, is present and the glass mass is free from reducing agents.

According to yet another feature of the present invention, the copper tin-containing bronze is used in an amount between 1.5 and 3 percent by weight of the soda-lime glass mass prior to melting. Advantageously, 0.5 to 2 percent by weight of saltpeter (potassium nitrate) is provided and 200 g of sodium silicate (waterglass) are used to wet 1 kg of the alloy powder. (Approximately 0.25 to 1 percent by weight of the glass mass is sodium silicate). The alloy powder is mixed with saltpeter (potassium nitrate) and the powder mixture is treated with the sodium silicate.

We have found it to be desirable to melt the mixture of glass-forming substances with the copper tin-bronze mixture, after the latter has been coated with the sodium silicate, in crucibles at temperatures up to 1,480°C for a period of 14 – 16 hrs in a weakly oxidizing atmosphere.

Experiments have shown that a film of waterglass forms around the alloy particles and expands as the temperature rises to 300°C by loss of water, the coated particles increasing in volume. As a result, the coated particles remain distributed in the mixture, without sinking to the bottom because of higher density until formation of the glass melt and aid in the diffusion of the alloy into the glass.

The sodium silicate coating, formed by the water glass on and around the alloy particles, melts at about 1,088°C, somewhat after the melting of the alloy, and thus constitutes a pocket in which the alloy is retained in suspension in the glass Melting is preferably carried out using an oxidizing flame for initial melting, followed by a neutral to slightly oxidizing flame during the latter steps. It has been found to be possible to retard the formation of the ruby color by increasing the quantity of saltpeter (potassium nitrate) and to accelerate coloration by reducing the quantity of saltpeter. In general, when the alloy and the potassium nitrate are added in increments, the rate of appearance of coloration may be controlled by varying the quantity of potassium nitrate supplied in the batch.

Of special importance is the fact that the furnace environment and conditions appear to have little if any effect on the color, that the quantities of colorant and potassium nitrate and proportions thereof determine the hue with high precision and the coloring of the glass is highly reproducible.

The ruby glass is preferably cast into bars of rectangular cross-section of a width and thickness of 5 × 3 cm and then rolled, annealed and used for ruby thin-layer glass applications.

EXAMPLE I

A glass mass of the following composition is charged into a conventional basin furnace:
75 percent by weight $SiO_2$
15 percent by weight $Na_2O$
3 percent by weight $K_2O$
mass until the latter melts to form a vitreous or liquid bath. As a consequence, the alloy is distributed uniformly in the liquid from locations within the body of the mass and does not form a pool on the bottom.

The tin bronze according to the present invention should contain about 60 percent copper and 40 percent tin. This, of course, is the preferred composition, although we may use tin bronzes containing 50 percent copper /50 percent tin to 70 perent copper/ 30 percent tin, all proportions by weight. Surprisingly, the trace impurities zinc, aluminum, iron, phosphorous and sulfur remain about the same for any given tin-alloy composition and ensure constancy of coloration. The hues obtained with one batch or alloy mass do not differ materially from the next.

According to another feature of the invention, the basic glass mass is introduced into a basin furnace at a temperature of about 1,450°C, whereupon the alloy coated with waterglass (sodium silicate) is introduced in a powdered form together with the saltpeter or potassium nitrate. The mixture is introduced in three to four steps with complete dispersal being permitted between the steps, whereupon the furnace is maintained at the relatively high temperature of 1,450° to 1,480°C for a period of about 3 hours and until air bubbles are no longer found in the melt. The melt is then being cooled to processing temperatures of about 1,200°C and the mass drawn into sheets or cast into bars. The ruby-red coloration appears upon rapid cooling.
6 percent by weight CaO
1 percent by weight $B_2O_3$.

3 percent by weight of this mass of a tin bronze consisting of 60 percent by weight copper and 40 percent by weight tin is prepared by turning a bar of the alloy and crumbling the turnings to a particle size of 5 microns to 50 microns. The particles are mixed with 1 percent (by weight of the glass mixture) of potassium nitrate powder and the mixture is coated with sodium silicate (waterglass) until the alloy particles are encased in a sheath of the latter. The resulting mixture was divided into four equal portions by weight for addition to the glass batch at intervals.

After introducing one of the portions into the original glass batch, the latter is melted and brought to a temperature of 1,480°C with an oxidizing flame, the temperature being measured at the flame. After the batch has melted, a second portion of the additive is introduced, whereupon the temperature is maintained between 1,450°C and 1,480°C for a period of 3 hours. The third portion of the additive is introduced after 1 hour and the fourth portion after 2 hours. At the end of about 3 hours, no more glass bubbles are observed in the mass. The glass is cooled to 1,200°C and drawn into bars of a rectangular cross-section 3 × 5 cm on a side. The glass bars are annealed in the conventional fashion. The product has a well-defined bright ruby-red coloration from which overlapped glassware may be obtained.

EXAMPLE II

A glass batch of the following composition is used:
72 percent by weight $SiO_2$
18 percent by weight $Na_2O$
2 percent by weight $K_2O$
7 percent by weight CaO
1 percent by weight $B_2O_3$ The aforementioned batch was melted in crucibles at a temperature of 1,480°C under the weakly oxidizing atmosphere. The additive consisted of 0.5 percent by weight (of the glass batch) potassium nitrate, 1.5 percent by weight 60:40 copper:tin bronze and sufficient sodium silicate to coat the particles as described. The mixture was added in four portions at intervals of 3 to 4 hours, whereupon glass bars were drawn as already described.

EXAMPLE III

Using the method of Example II, ruby-red glass bars for carving, layering upon other soda-lime glass and other hot working is produced from a glass batch of the following composition:

73.5 percent by weight $SiO_2$
16 percent by weight $Na_2O$
3 percent by weight $K_2O$
7 percent by weight CaO and
0.5 percent by weight $B_2B_3$.

The colorant consisted of 60:40 copper:tin bronze in an amount of 2 percent by weight of the glass batch and 1 percent by weight of the glass batch of potassium nitrate. In this case, the sodium silicate was used to coat only the metal particles and the potassium nitrate was then mixed therewith.

Throughout the treatment in Examples I — III, the melt was carried out without reducing agents.

We claim:

1. A process for producing copper ruby glass comprising the steps of:

coating particles of a copper tin alloy powder consisting essentially of 50 percent by weight to 70 percent by weight copper and 50 percent by weight to 30 percent by weight tin with sodium silicate water-glass solution;

mixing the coated alloy particles with potassium nitrate powder, and adding to a soda-lime glass batch mixture, said soda-lime glass mixture consisting essentially of 72 to 75 percent by mixture; $SiO_2$, 15 to 18 percent by weight $Na_2O$, 1 to 3 percent $K_2O$, 6 to 8 percent CaO and 0.5 to 1 percent by weight $B_2O_3$, being free from reducing agents, and in which the alloy powder is 1.5 to 3 percent, sodium silicate 0.25 to 1 percent, and potassium nitrate about 0.5 to 2 percent, all by weight of the glass mixture;

melting the resulting mixture in a weakly oxidizing atmosphere and heating same to a temperature of substantially 1,450°C to 1,480°C for a period of substantially 14 to 16 hours to form a melt; and cooling said melt to produce the ruby colored glass body.

2. The process defined in claim 1 wherein the mixture of said coated alloy particles, said potassium nitrate and said soda-lime glass mass is introduced in three to four increments into a furnace for melting and heating therein.

3. The process defined in claim 1 wherein said alloy consists of substantially 60 percent by weight copper and 40 percent by weight tin.

* * * * *